Patented May 16, 1950

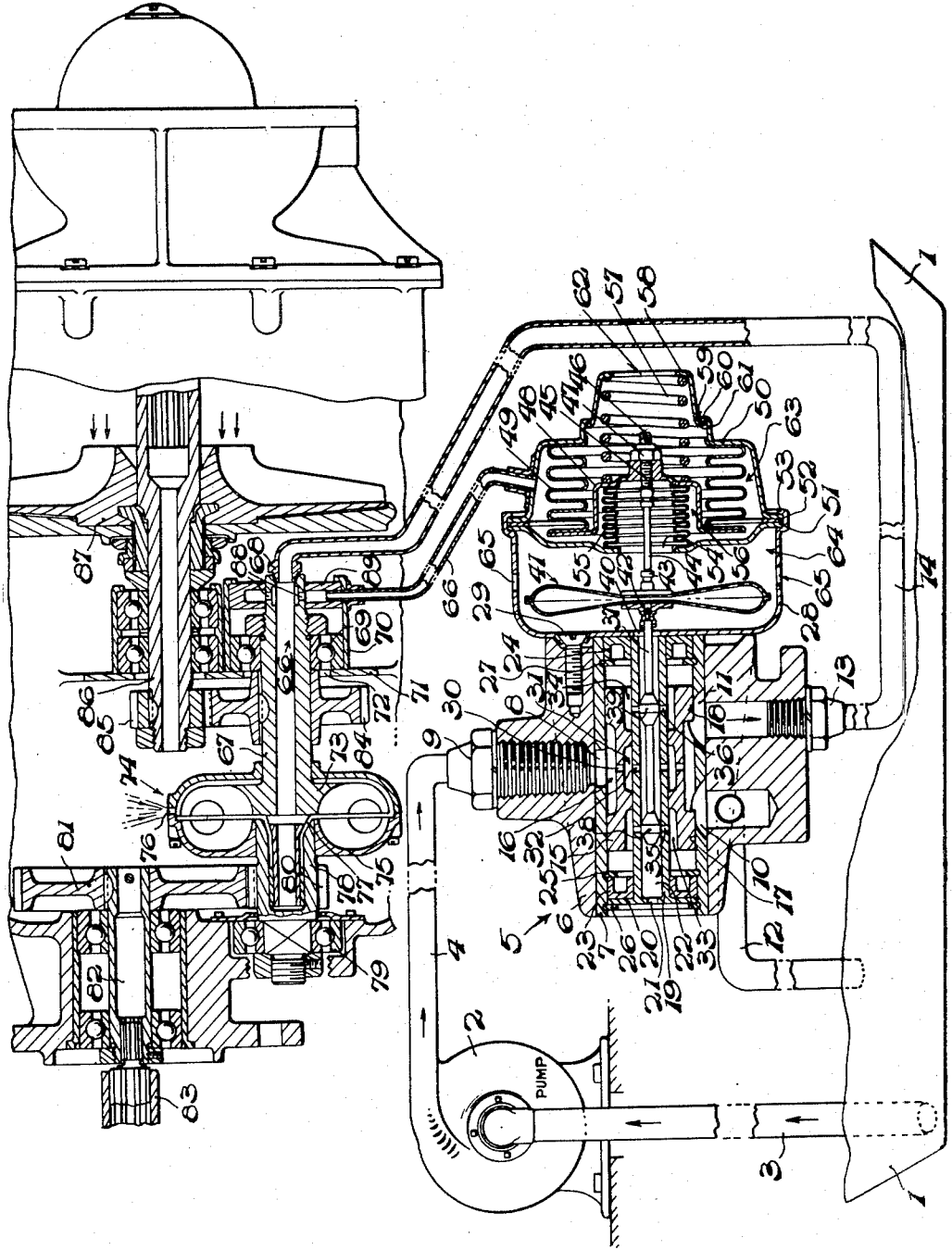

2,507,945

UNITED STATES PATENT OFFICE 2,507,945

CABIN SUPERCHARGER CONTROL MEANS AND SYSTEM

Walter D. Teague, Jr., Alpine, N. J., assignor to Bendix Aviation Corporation, Teterboro, N. J., a corporation of Delaware Application April 4, 1944, Serial No. 529,519

12 Claims. (Cl. 230—114)

My present invention relates to a novel control system for a supercharger and more particularly to novel means for regulating a cabin supercharger in accordance with atmospheric conditions.

An object of my invention is to provide a novel control system for regulating the speed of a cabin supercharger in accordance with atmospheric conditions.

Another object of my invention is to provide novel hydraulic means for regulating the driven speed of a cabin supercharger in response to changes in altitude.

Another object of my invention is to provide a novel mechanism responsive to the speed of a driven member and operating in series with an atmospheric pressure responsive device for regulating the speed of said driven member in accordance with altitude conditions and a novel floating mounting means for such atmospheric pressure responsive device.

Another object of my invention is to provide a novel compact control mechanism, including a servo valve slidably mounted within a piston controlled thereby for effecting a control function.

Another object of my invention is to provide novel speed responsive hydraulic means for regulating the coupling ratio between driving and driven members in response to atmospheric pressure conditions.

Another object of my invention is to provide such a cabin supercharger regulator device having simplicity of construction, compactness and light weight so as to adapt it for manufacture and installation at low cost.

The above and further objects and novel features of this invention will more fully appear from the following detailed description and the accompanying drawing. It is to be expressly understood, however, that the drawing is for the purpose of illustration only and is not designed as a definition of the limits of the invention, reference being had for this purpose to the appended claims.

In the drawing there is shown diagrammatically a system embodying my invention in which my novel control device is shown in a somewhat enlarged sectional view for the purposes of better illustration.

Referring more particularly to the drawing there is indicated by the numeral 1 a sump for carrying a suitable hydraulic fluid such as oil.

The hydraulic fluid is drawn from the sump 1 by a suitable pump 2 through a conduit 3. The pump 2 has an outlet conduit 4 which leads to a control mechanism indicated generally by the numeral 5. The pump 2 may be conveniently driven by the main aircraft engine or by any other suitable power means such as a separate electric motor.

The control mechanism 5 includes a casting or housing 6 in which there is provided a cylindrical member 7 having formed therein an inlet port 8 which is connected through a suitable nipple 9 to the conduit 4. The member 7 has further provided outlet ports 10 and 11. The port 10 is connected by a return conduit 12 to the sump 1, while the port 11 is connected through a suitable nipple 13 to a conduit 14 for a purpose which will be explained hereinafter.

Slidably mounted in the cylinder 7 is a piston 15 having an annular channel 16 formed in the outer surface thereof and land portions 17 and 18 provided at opposite sides of the channel 16. The land portions 17 and 18 are arranged to control the opening of the ports 10 and 11. The piston 15 is slidably mounted on a tubular member 19 concentrically mounted in the cylinder 7. The tubular member 19 has affixed at one end thereof a disk 20 having a port 21 provided therein and opening through the disk 20, and into the interior 22 of the tubular member 19. The tubular member 19 is supported in position within the cylinder 7 by suitable sealing members 23 and 24 provided at opposite ends of the cylinder 7. The sealing members 23 and 24 may be formed of a suitable plastic material such as rubber. The member 23 is positioned at one side of the disk 20 and is locked in position by a spring ring 25. A similar spring ring 26 is provided at the opposite side of the disk 20. The spring rings 25 and 26 fit within suitable annular grooves provided in the inner surface of the cylinder 7.

A similar spring ring 27 is provided at the inner side of the sealing member 24 and is likewise mounted within a suitable annular groove provided in the inner surface of the cylinder 7. The opposite side of the sealing member 24 abuts against a casing 28 secured to the casting 6 by a bolt 29 screw threadedly engaged in the casting 6. Thus there is provided in the cylindrical member 7 by the sealing members 23 and 24 a chamber in which there is slidably mounted the piston 15.

Leading from the channel 16 provided in the piston 15 are ports 30 opening into a channel 31 provided in the interior of the piston 15. Ports 32 lead from the channel 31 into the interior 22 of the tubular member 19 as shown.

The piston 15 has provided at opposite ends thereof, recesses 33 and 34. Ports 35 and 36 provided in the tubular member 19 open from the recesses 33 and 34 into the interior 22 of the tubular member 19.

A control rod 37 having the valve members 38 and 39 for controlling the ports 35 and 36 is slidably mounted in the tubular member 19 as shown. The control rod 37 projects through an opening 40 provided in the casing 28. Affixed to the free end of the control rod 37 within the casing 28 is a partially evacuated bellows or aneroid 41 which is coupled at one side as indicated at 42 to the control rod 37 and at the opposite side the aneroid 41 is similarly coupled at 43 to a control rod 44 so as to provide a novel floating mounting for the aneroid 41.

As shown in the drawing the other end of the control rod 44 has provided a screw member 45 having a cleft portion 46 at the end thereof. The member 45 is screw threadedly engaged in a nut 47 fixedly mounted on a movable plate or diaphragm 48. The plate 48 is movably mounted at one end of a bellows 49 which is affixed at the opposite end to the inner side of a casing 50. The casing 50 forms a part of the casing 28 and is secured with a second fixed limiting plate 51 and spacing washer 52 in an annular groove 53 formed in the inner surface of the casing 28. The plate 51 has provided therein an opening 54 through which the control rod 44 extends. Positioned around the control rod 44 and affixed at opposite ends to the fixed plate 51 and to the movable plate 48 is a sealing bellows 55 positioned within a suitable recessed portion 56 provided in the plate 48.

At the opposite side of the plate 48 is a helical spring 57 which engages at one end the plate 48 and at the opposite end a cap 58. The casing 50 has provided an opening 59 through which projects the cap 58 under biasing force of the spring 57.

The opening 59 is defined by an annular flange 60 arranged to engage a cooperating flange 61 formed on the cap 58.

The cap 58 has formed therein an opening 62 through which a screw driver or other similar tool may be inserted for engaging in the cleft portion 46 of the screw 45 projecting through the nut 47 so as to effect adjustment of the control rod 37 for calibrating purposes.

From the foregoing arrangement it will be readily seen that there is formed within the casing 50 a chamber 63 within which the pressure responsive diaphragm plate 48 is mounted. There is further provided in the casing 28 a chamber 64 open through ports 65 to atmospheric pressure, in which chamber 64 the aneroid 41 is mounted. A conduit 66 opens into the chamber 63 for a purpose which will be explained hereinafter.

The conduit 14 leads from the port 11, as previously described, to a channel 66 drilled in a driven shaft 67. The conduit 14 projects into the channel 66 through a nipple 68 as shown.

The shaft 67 is rotatably mounted at one end in anti-friction roller bearings 69 provided in a casing 70 affixed to a supporting plate 71. The driven shaft 67 extends through a suitable opening 72 provided in the supporting plate 71 and has affixed at the other end a driven element 73 of a hydraulic fluid coupling 74.

The fluid coupling may be of any suitable type and includes the driven and driving elements 73 and 75. There is further provided in the hydraulic fluid coupling 74 a fluid outlet port 76 through which the hydraulic fluid may be returned from the coupling 74 to the sump 1. The hydraulic fluid is fed to the coupling 74 through passageways 77 leading from the channel 66.

The element 75 is connected to one end of a driving shaft 78 rotatably mounted at the opposite end in roller bearings 79. The shaft 78 is connected by a suitable gear train 80 and 81, and shaft 82 to the driving shaft 83 of an aircraft engine or other suitable power means.

The driven shaft 67 is likewise connected by a suitable gear train 84 and 85 to the driven shaft 86 of a cabin supercharger indicated generally by the numeral 87.

The driven shaft 67 has provided suitable ports 88 which open from the channel 66 into a receptacle 89 surrounding the ports 88 and fixedly mounted in the casing 70. The conduit 66 previously described leads from the receptacle 89 to the chamber 63. The ports 88 in the rotating shaft 67 serve as a form of centrifugal pump so that the pressure exerted within the chamber 63 will represent a measure of the pressure exerted by the fluid medium discharged through the ports 88 during rotation of the shaft 67. Since such pressure will vary in mathematical relationship to the speed of rotation of the shaft 67, it will be readily apparent that the pressure exerted on the plate 48 through the hydraulic fluid in the chamber 63 will be a measure of the speed of rotation of the shaft 67.

Moreover the speed of rotation of the driven shaft 67 will be dependent upon the speed of the driven element 73 of the hydraulic coupling 74 and the coupling ratio between the driving element 75 and driven element 73. The coupling ratio will in turn be controlled by the quantity of hydraulic fluid supplied the coupling 74 through the conduit 14 and channel 66.

The quantity of fluid supplied through the conduit 14 is controlled by the position of the lands 17 and 18 of the valve piston 15 in relation to the openings 10 and 11. The position of valve piston 15 is regulated through the servo control valve 37 operably connected through the rods 37 and 44 to the atmospheric pressure responsive bellows 41 and driven shaft speed responsive mechanism 49.

In the operation of the foregoing control system it will be seen that with the control system in a balanced state a rise in altitude will cause the expansion of the partially evacuated bellows 41 causing the control rod 37 and servo valves 38 and 39 to be shifted toward the left, whereupon port 35 will be opened to the pressure medium supplied to the interior 22 of tube 19 through port 32, channel 31, ports 30 leading from channel 31 to channel 16 and conduit 4. Opening of port 35 will thus cause pressure to be applied at the left of the piston valve 15. Similarly valve 39 will open port 36 so as to permit the medium at the right of the piston valve 15 to pass out port 36 through tube 19, out port 40 and into chamber 64 and out lower port 65 so as to return to the sump 1. Thus the valve piston 15 upon an increase in altitude and corresponding decrease in atmospheric pressure will be shifted toward the right increasing the opening of port 11 and decreasing the opening of port 10 so that a greater supply of fluid medium will be furnished under pressure of the pump 2 to the coupling 14 through conduit 14 and channel 66.

This increase in the supply of fluid medium will decrease the coupling ratio or slippage at the coupling 14 so as to increase the speed of rotation of the driven shaft 67. An increase in the speed of rotation of the shaft 67 will in turn increase through the ports 88 the pressure of the oil exerted on the diaphragm 48 causing the speed responsive mechanism 49 to effect a follow-up action shifting the control rod 44 to the right, whereupon valves 38 and 39 will close ports 35 and 36 once again.

Upon a decrease in altitude followed by a corresponding increase in atmospheric pressure an opposite effect will take place, whereupon the aneroid will contract shifting the rod 37 to the right so as to apply a hydraulic pressure medium at the right of the piston valve 15 through the port 36 and open the port 35 so as to permit the hydraulic fluid at the left of the piston valve 15 to escape through port 35, tube 19 and port 21 to the sump 1.

Such action will thereupon cause a shifting of the valve piston to the left decreasing the size of the opening of port 11 leading to the coupling 14 and increasing the size of the opening of port 10 leading to the sump 1, whereupon the fluid coupling or slippage ratio will be increased so as to cause the shaft 67 to be driven at a relatively slower rate, decreasing the pressure exerted through port 88 and conduit 66 on the diaphragm plate 48 so as to effect the return movement of the servo valve 37 to close ports 35 and 36.

From the foregoing it will likewise be seen that an increase or decrease in the speed of the driven shaft 67 due to change in the aircraft engine speed or load on the supercharger will cause a corresponding adjustment by the speed responsive mechanism 49 so as to effect a correction of the fluid coupling ratio to maintain the driven speed of the supercharger at a substantially constant speed for any given atmospheric pressure value.

Moreover, it will be seen that as the altitude increases causing a corresponding decrease in atmospheric pressure, an adjustment of the control rod 37 will effect a decrease in the fluid coupling ratio so as to increase the driven speed of the supercharger and thus increase the supply of air furnished by the supercharger to the aircraft at high altitudes where such air supply is most essential, while at lower altitudes where such increased air supply is not required the coupling ratio or slippage between the driving and driven elements is proportionately increased. Thus I have provided novel means for regulating a cabin supercharger in accordance with atmospheric condition.

Although only one embodiment of my invention has been illustrated and described, various changes in the form and relative arrangement of the parts, which will now appear to those skilled in the art, may be made without departing from the scope of the invention. Reference is therefore, to be had to the appended claims for a definition of the limits of the invention.

What is claimed is:

1. A control device, comprising, in combination, a tubular member, a control valve slidably mounted within said tubular member, and a piston slidably mounted on said tubular member, and said tubular member having formed therein ports, whereby a fluid medium may be directed by said valve in such a manner as to control the operation of said piston, a housing in which there is formed a chamber having said piston slidably mounted therein and said housing having ports opening into said chamber controlled by said piston.

2. A control device, comprising, in combination, a housing having a chamber formed therein, a tubular member mounted within said chamber, a control valve slidably mounted within said tubular member, a piston slidably mounted in said chamber and on said tubular member, and said tubular member having formed therein first ports for controlling the flow of a fluid medium to effect movement of said piston within said chamber, and said first ports controlled by movement of said control valve, and said chamber having formed therein second ports controlled by movement of said piston, whereby movement of said control valve may cause said piston to effect the control of said second ports.

3. A control device, comprising, in combination in a single unit, a cylindrical member mounted in said unit, said cylindrical member having an inlet port and first and second outlet ports provided therein, a piston slidably mounted in said cylindrical member, said piston having formed therein an annular channel cooperating with said inlet and outlet ports for regulating the flow of a fluid medium through said outlet ports, a tubular member mounted within said cylindrical member and supporting said piston in slidable relation thereon, inlet port means opening from said channel into the interior of said tubular member, said tubular member having a pair of outlet port means opening at opposite ends of said piston, a pair of valve members slidably mounted within said tubular member for controlling the flow of a fluid medium through the outlet port means provided in said tubular member so as to determine the direction of movement of said piston.

4. For use with a supercharger having means for driving the supercharger at a variable speed; a control device, comprising, in combination in a single unit, a cylindrical member mounted in said unit, said cylindrical member having an inlet port and first and second outlet ports provided therein; a piston slidably mounted in said cylindrical member, said piston having formed therein an annular channel cooperating with said inlet and outlet ports for regulating the flow of a fluid medium through said outlet ports, a tubular member mounted within said cylindrical member and supporting said piston in slidable relation thereon, inlet port means opening from said channel into the interior of said tubular member, said tubular member having a pair of outlet port means opening at opposite ends of said piston, a pair of valve members slidably mounted within said tubular member for controlling the flow of a fluid medium through the outlet port means provided in said tubular member so as to determine the direction of movement of said piston, atmospheric pressure responsive means and liquid pressure responsive means operably connected to said valve members for controlling the movement thereof, and one of the outlet ports in said cylindrical member arranged to be connected to the variable speed driving means for controlling the driving means in accordance with the flow of said fluid medium through said one outlet port.

5. For use with a supercharger having means for driving the supercharger at a variable speed; a control device, comprising, in combination in a single unit, a cylindrical member mounted in said unit, said member having an inlet port and first and second outlet ports provided therein, a piston slidably mounted in said cylindrical member, said piston having formed therein an annular channel cooperating with said inlet and outlet ports for regulating the flow of a fluid medium through said outlet ports, a tubular member mounted within said cylindrical member and supporting said piston in slidable relation thereon, inlet port means opening from said channel into the interior of said tubular member, said tubular member having a pair of outlet port means opening at opposite ends of said piston, a pair of valve members slidably mounted within said tubular member for controlling the flow of a fluid medium through the outlet port means provided in said tubular member so as to determine the direction of movement of said piston, a first rod connected to said valve members and projecting at one end from said tubular member, a first collapsible bellows operably connected at one side to the projecting end of said first rod, a second collapsible bellows, a second rod connecting the other side of said first bellows to one side of the second bellows, the opposite side of said second bellows being fixedly mounted in said unit so that said first and second rods operatively support said first collapsible bellows in floating relation, said first bellows arranged to impart movement to said valve members upon a change in atmospheric pressure, and said second bellows to impart movement to said valve members upon a change in an operating liquid pressure, and one of the outlet ports in said cylindrical member adapted to be operably connected to the variable speed driving means.

6. Means for regulating the speed of a supercharger for an aircraft cabin, comprising, in combination, atmospheric pressure responsive means to set the speed of said supercharger, supercharger speed responsive means including a hydraulic pump, driving means, variable hydraulic coupling means for connecting said driving means to said supercharger, regulating means for said variable hydraulic coupling means to control a liquid medium supplied said coupling and pump, said regulating means operably controlled by said atmospheric pressure responsive means and said supercharger speed responsive means, whereby said supercharger may be driven at a selected speed set by said atmospheric pressure responsive means and which set speed increases upon a decrease in atmospheric pressure.

7. For use with an aircraft cabin supercharger having driving means, hydraulic coupling means for connecting said driving means to said supercharger, and a centrifugal pump connected through said hydraulic coupling to said driving means; a regulator comprising a control valve for varying the flow of liquid medium to said hydraulic coupling and said centrifugal pump so as to regulate said hydraulic coupling, a liquid pressure responsive means operatively controlled by a liquid medium under pressure of said centrifugal pump, and atmospheric pressure responsive means to set the speed of said supercharger, said liquid pressure responsive means and said atmospheric pressure responsive means operably connected to said control valve, and said liquid pressure responsive means regulating the driven speed of said supercharger to said set value.

8. For use with a supercharger having means for driving the supercharger at a variable speed; a control device, comprising, in combination, a tubular member, a control valve slidably mounted within said tubular member, and a piston slidably mounted on said tubular member for controlling the variable speed driving means, and said tubular member having formed thereon ports, whereby a liquid medium may be directed by said valve in such a manner as to control the operation of said piston, a first collapsible atmospheric pressure responsive bellows operably connected at one side to said control valve, and a second collapsible liquid pressure responsive bellows operably connected to another side of said first collapsible bellows, said first bellows for actuating said control valve upon changes in atmospheric pressure to set the speed of said supercharger, and said second bellows for actuating said control valve upon changes in the speed of said supercharger to maintain the speed of said supercharger at the speed set by said first bellows, and said control valve and second bellows operably supporting said first bellows in floating relation.

9. Means for regulating the speed of a supercharger for an aircraft cabin, comprising, in combination, an atmospheric pressure responsive diaphragm for selectively determining the speed of said supercharger, a hydraulic pump drivingly connected to said supercharger and having an output pressure proportional to the speed of the supercharger, and liquid pressure responsive means affected by the output of said pump for maintaining the speed of said supercharger at said selected speed.

10. In combination, an aircraft cabin compressor, variable speed driving means for the supercharger including a hydraulic coupling, regulating means for said driving means including a regulating valve for regulating the flow of liquid to said hydraulic coupling, a hydraulic pump driven by said variable speed driving means and having a liquid inlet controlled by said regulating valve and a liquid outlet pressure proportional to the driven speed of said compressor, a diaphragm affected by the liquid pressure output from said pump to control the position of said regulating valve to maintain the speed of said supercharger at a set value, and means responsive to variations of atmospheric pressure to increase said speed setting upon decreasing atmospheric pressure.

11. In combination, a supercharger, means including a hydraulic coupling for driving the supercharger, said coupling having a hollow drive shaft through which a liquid is supplied thereto, and a hollow driven shaft opening from said coupling and having outlet ports formed therein to provide a centrifugal pump, a valve member to regulate the flow of liquid to said coupling and pump, and a governor responsive to the liquid outlet pressure from said pump and operably connected to said regulating valve member.

12. In combination, a supercharger, means including a fluid coupling having an impeller and a runner for driving the supercharger, means for regulating the supply of fluid to the fluid coupling, a governor including a fluid pump driven by said runner for supplying a fluid pressure proportional to the driven speed of said supercharger, and said regulating means operably controlled by said governor to maintain the speed of the supercharger at a preselected value.

WALTER D. TEAGUE, Jr.

REFERENCES CITED

The following references are of record in the file of this patent:

UNITED STATES PATENTS

| Number | Name | Date |
| --- | --- | --- |
| 818,968 | Johnson | Apr. 24, 1906 |
| 1,202,173 | Fleming | Oct. 24, 1916 |
| 1,241,372 | Guyer | Sept. 25, 1917 |
| 2,212,631 | Baker | Aug. 27, 1940 |
| 2,217,364 | Halford | Oct. 8, 1940 |
| 2,246,207 | Hewitt | June 17, 1941 |
| 2,295,728 | Gess | Sept. 15, 1942 |
| 2,336,844 | Buck | Dec. 14, 1943 |
| 2,359,615 | Browne | Oct. 31, 1944 |
| 2,383,719 | Halford et al. | Aug. 28, 1945 |
| 2,403,399 | Reggio | July 2, 1946 |
| 2,451,835 | Johnson | Oct. 19, 1948 |

FOREIGN PATENTS

| Number | Country | Date |
| --- | --- | --- |
| 231,156 | Great Britain | Sept. 10, 1926 |
| 378,754 | Great Britain | Aug. 18, 1932 |
| 425,831 | Germany | Feb. 25, 1926 |
| 505,829 | Great Britain | May 17, 1939 |